United States Patent
Barriac et al.

(10) Patent No.: US 10,091,714 B2
(45) Date of Patent: Oct. 2, 2018

(54) ENABLING CHANNEL REUSE FOR SELECTIVE BSS

(71) Applicant: QUALCOMM Incorporated, San Diego, CA (US)

(72) Inventors: Gwendolyn Denise Barriac, Encinitas, CA (US); George Cherian, San Diego, CA (US); Simone Merlin, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 15/176,060

(22) Filed: Jun. 7, 2016

(65) Prior Publication Data
US 2016/0366637 A1    Dec. 15, 2016

Related U.S. Application Data

(60) Provisional application No. 62/174,444, filed on Jun. 11, 2015.

(51) Int. Cl.
*H04W 4/00* (2018.01)
*H04W 48/16* (2009.01)
(Continued)

(52) U.S. Cl.
CPC ........... *H04W 48/16* (2013.01); *H04W 72/10* (2013.01); *H04W 74/006* (2013.01);
(Continued)

(58) Field of Classification Search
None
See application file for complete search history.

(56) References Cited

U.S. PATENT DOCUMENTS

| | | | | |
|---|---|---|---|---|
| 8,306,003 | B2 * | 11/2012 | Ramesh | H04W 74/0866 370/338 |
| 2006/0280204 | A1 * | 12/2006 | Nagata | H04L 1/1671 370/473 |

(Continued)

FOREIGN PATENT DOCUMENTS

| | | |
|---|---|---|
| EP | 3054736 A1 | 8/2016 |
| WO | 2015050311 A1 | 4/2015 |

OTHER PUBLICATIONS

Fang Y., et al., "A Two-level carrier Sensing Mechanism for Overlapping BSS Problem in WLAN", Local and Metropolitan Area Networks, 2005, LANMAN 2005, The 14th IEEE workshop on Chania, Crete, Greece, XP010854301, Sep. 18, 2005, 6 pages.
(Continued)

*Primary Examiner* — Jutai Kao
(74) *Attorney, Agent, or Firm* — Arent Fox, LLP

(57) ABSTRACT

A method, a computer-readable medium, and an apparatus are provided. The apparatus may be a station. The apparatus may be configured to receive, on a channel, a packet from a wireless device. The apparatus may configured to determine a BSSID or a color associated with the received packet. The apparatus may be configured to determine whether to defer transmissions on the channel based on the determined BSSID or the determined color associated with the packet and an indication. The indication may include a list of BSSIDs or color information.

26 Claims, 7 Drawing Sheets

(51) Int. Cl.
*H04W 72/10* (2009.01)
*H04W 74/00* (2009.01)
*H04W 76/10* (2018.01)
*H04W 72/12* (2009.01)
*H04W 16/14* (2009.01)
*H04W 84/12* (2009.01)

(52) U.S. Cl.
CPC ............ *H04W 76/10* (2018.02); *H04W 16/14* (2013.01); *H04W 72/1242* (2013.01); *H04W 84/12* (2013.01)

(56) References Cited

U.S. PATENT DOCUMENTS

| | | | |
|---|---|---|---|
| 2014/0328191 | A1 | 11/2014 | Barriac et al. |
| 2015/0078299 | A1* | 3/2015 | Barriac ............... H04W 74/006 370/329 |
| 2015/0110093 | A1 | 4/2015 | Asterjadhi et al. |
| 2015/0124744 | A1 | 5/2015 | Zhu et al. |
| 2015/0264617 | A1* | 9/2015 | Choudhury ........... H04W 36/30 370/332 |
| 2015/0381512 | A1* | 12/2015 | Park ..................... H04W 72/12 370/445 |

OTHER PUBLICATIONS

International Search Report and Written Opinion—PCT/US2016/036487—ISA/EPO—dated Sep. 1, 2016.

* cited by examiner

ENABLING CHANNEL REUSE FOR SELECTIVE BSS

CROSS-REFERENCE TO RELATED APPLICATION(S)

This application claims the benefit of U.S. Provisional Application Ser. No. 62/174,444, entitled "ENABLING CHANNEL REUSE FOR SELECTIVE BSS" and filed on Jun. 11, 2015, which is expressly incorporated by reference herein in its entirety.

BACKGROUND

Field

The present disclosure relates generally to communication systems, and more particularly, to techniques of enabling a station or an access point to implement channel reuse for selective basic service sets (BSSs).

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

During channel reuse, a station may drop packets from an overlapping basic service set (OBSS) without further feasibility considerations. There is a need for improving implementation of channel reuse.

SUMMARY

The systems, methods, computer-readable medium, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

In an aspect of the disclosure, a method, a computer-readable medium, and an apparatus are provided. The apparatus may be a station. The station may receive, on a channel, a packet from a wireless device. The station may determine a basic service set identifier (BSSID) or a color associated with the received packet. The station may determine whether to defer transmissions on the channel based on the determined BSSID or the determined color associated with the packet and an indication. The indication may include a list of BSSIDs or color information.

In another aspect of the disclosure, an apparatus for wireless communication is provided. The apparatus may be a station. The station may include means for receiving, on a channel, a packet from a wireless device. The station may include means for determining a BSSID or a color associated with the received packet. The station may include means for determining whether to defer transmissions on the channel based on the determined BSSID or the determined color associated with the packet and an indication. The indication may include a list of BSSIDs or color information. The station may include means for dropping the packet based on the determination to defer transmissions. The means for dropping may be configured to discard the packet and to not set a network allocation vector based on the packet. In one configuration, the means for determining whether to defer transmissions may be configured to refrain from transmitting during a time period reserved on the channel on which the packet is received, in which the time period is less than or equal to a time duration indicated in the packet. In another aspect, the list of BSSIDs may include multiple BSSIDs associated with a same access point, and the list of BSSIDs may indicate BSSIDs to which transmission is to be deferred or to which transmission is not to be deferred. In another aspect, the station may be associated with a first access point, the list of BSSIDs may include at least one BSSID associated with a second access point that is co-located with the first access point, and the list of BSSIDs may instruct the station to defer transmission if packets are received from the at least one BSSID. In another configuration, the station may include means for receiving the indication from an access point associated with the station. In another aspect, the indication may be received in an association response from the access point, from a management frame from the access point, or from a beacon from the access point. In another aspect, the color information may include one or more colors corresponding to one or more basic service sets to which transmission is to be deferred or to which transmission is not to be deferred. In another aspect, a color included in the color information may be associated with multiple basic service sets or multiple access points.

In another aspect of the disclosure, a computer-readable medium of a wireless communication device storing computer executable code is provided. The computer-readable medium may be associated with a station and include code to receive, on a channel, a packet from a wireless device. The computer-readable medium may include code to determine a BSSID or a color associated with the received packet. The computer-readable medium may include code to determine whether to defer transmissions on the channel based on the determined BSSID or the determined color associated with the packet and an indication. The indication may include a list of BSSIDs or color information. The computer-readable medium may include code to drop the packet based on the determination to defer transmissions. The code to drop the packet may include code to discard the packet and to not set a network allocation vector based on the packet. In one configuration, the code to determine whether to defer transmissions may include code to refrain from transmitting during a time period reserved on the channel on which the packet is received, in which the time period is less than or equal to a time duration indicated in the packet. In another aspect, the list of BSSIDs may include multiple BSSIDs associated with a same access point, and the list of BSSIDs may indicate BSSIDs to which transmission is to be deferred or to which transmission is not to be deferred. In another aspect, the station may be associated with a first access point, the list of BSSIDs may include at least one BSSID associated with a second access point that is co-located with the first access point, and the list of BSSIDs may instruct the station to defer transmission if packets are received from the at least one BSSID. In another configuration, the computer-readable medium may include code to receive the indication from an access point associated with the station. In another aspect, the indication may be received in an association response from the access point, from a management frame from the access point, or from a beacon from the access point. In another aspect, the color information may include one or more colors corresponding to one or more basic service sets to which transmission is to be deferred or to which transmission is not to be deferred. In another aspect, a color included in the color information may be associated with multiple basic service sets or multiple access points.

In another aspect of the disclosure, a method, a computer-readable medium, and an apparatus are provided. The apparatus may be an access point. The access point may determine at least one basic service set (BSS) whose packets are to be deferred to by one or more stations in a BSS associated with the access point. The access point may transmit an indication of the at least one BSS to the one or more stations.

In another aspect of the disclosure, an apparatus for wireless communication is provided. The apparatus may include means for determining at least one BSS whose packets are to be deferred to by one or more stations in a BSS associated with the access point. The apparatus may include means for transmitting an indication of the at least one BSS to the one or more stations. In one aspect, the at least one BSS to be deferred to is determined based on a signal strength of a signal received at the access point from a device associated with the at least one BSS to be deferred to. In another aspect, the at least one BSS to be deferred to is determined based on a distance between the BSS and the at least one BSS to be deferred to. In another aspect, the at least one BSS to be deferred to is determined through a negotiation between the BSS and the at least one BSS to be deferred to. In another aspect, the indication is transmitted to the one or more stations in an association response, in a management frame, or in a beacon frame. In another aspect, the indication includes one of a list of BSSIDs to which the one or more stations are to defer transmissions or not to defer transmissions or color information that includes one or more colors identifying BSSs to which the one or more stations are to defer transmissions or not to defer transmissions.

In another aspect of the disclosure, a computer-readable medium of a wireless communication device storing computer executable code is provided. The computer-readable medium may be associated with an access point and include code to determine at least one BSS whose packets are to be deferred to by one or more stations in a BSS associated with the access point. The computer-readable medium may include code to transmit an indication of the at least one BSS to the one or more stations. In one aspect, the at least one BSS to be deferred to is determined based on a signal strength of a signal received at the access point from a device associated with the at least one BSS to be deferred to. In another aspect, the at least one BSS to be deferred to is determined based on a distance between the BSS and the at least one BSS to be deferred to. In another aspect, the at least one BSS to be deferred to is determined through a negotiation between the BSS and the at least one BSS to be deferred to. In another aspect, the indication is transmitted to the one or more stations in an association response, in a management frame, or in a beacon frame. In another aspect, the indication includes one of a list of BSSIDs to which the one or more stations are to defer transmissions or not to defer transmissions or color information that includes one or more colors identifying BSSs to which the one or more stations are to defer transmissions or not to defer transmissions.

BRIEF DESCRIPTION OF THE DRAWINGS

FIG. 5 is a flow chart of a method/process of an access point for sending indications of BSSs to be deferred to.

DETAILED DESCRIPTION

Figure 1:
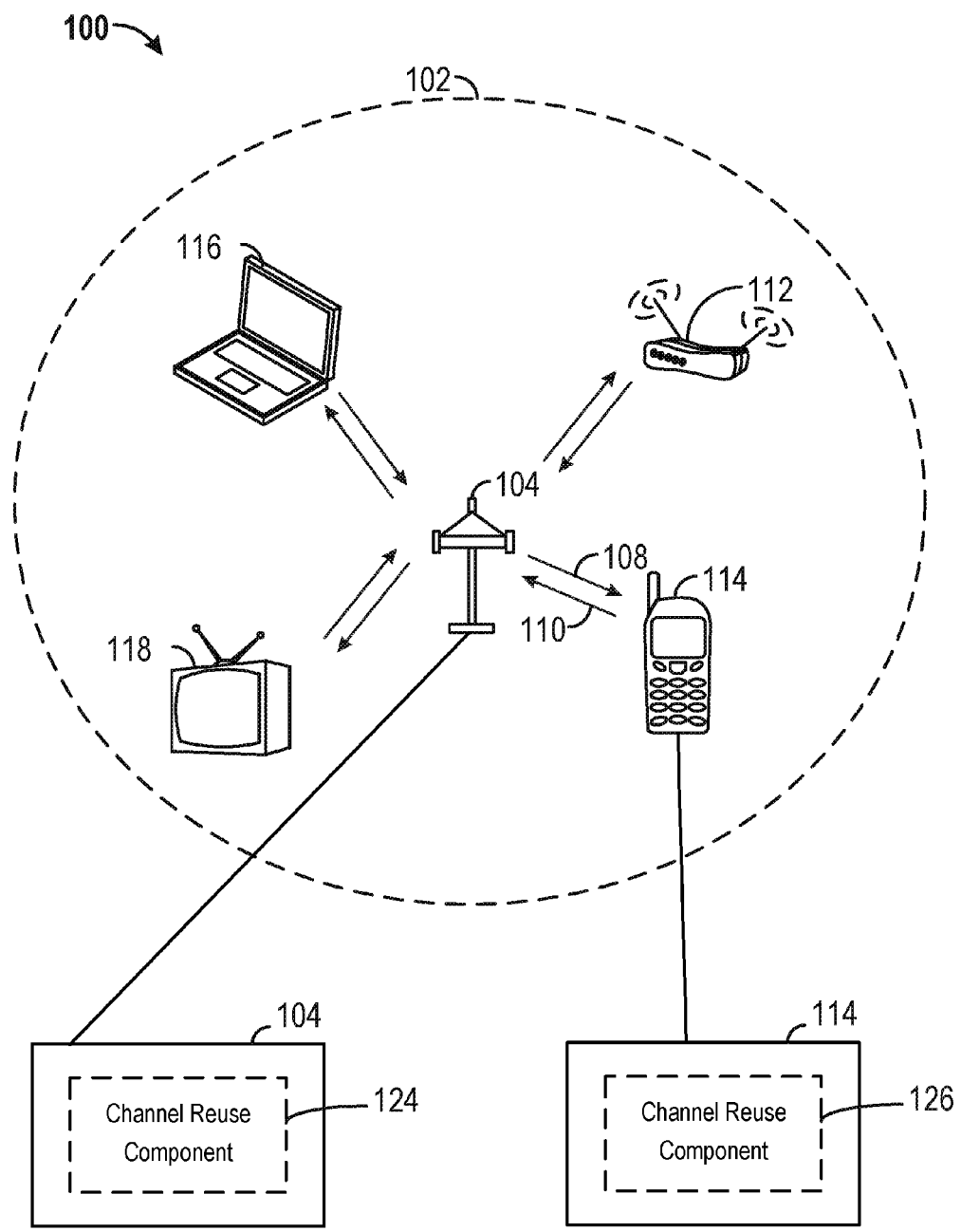
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an Institute of Electrical and Electronics Engineers (IEEE) 802.11 protocol using orthogonal frequency-division multiplexing (OFDM), direct-sequence spread spectrum (DSSS) communications, a combination of OFDM and DSSS communications, or other schemes. Implementations of the IEEE 802.11 protocol may be used for sensors, metering, and smart grid networks. Advantageously, aspects of certain devices implementing the IEEE 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations, a STA may also be used as an AP.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations, a station may comprise a cellular telephone, a cordless telephone, a Session Initiation Protocol (SIP) phone, a wireless local loop (WLL) station, a PDA, a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the IEEE 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the IEEE 802.11 standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/OFDMA techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a BSS. It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include an channel reuse component 124. In certain configurations, the channel reuse component 124 may be configured to determine at least one BSS whose packets are to be deferred to by one or more stations in a BSS associated with the access point. The channel reuse component 124 may transmit an indication of the at least one BSS to the one or more stations.

In another aspect, the STA 114 may include one or more components for performing various functions. For example, the STA 114 may include an channel reuse component 126. In certain configurations, the channel reuse component 126 may be configured to receive, on a channel, a packet from a wireless device. The STA 114 may determine a BSSID or a color associated with the received packet. The STA 114 may determine whether to defer transmissions on the channel based on the determined BSSID or the determined color associated with the packet and an indication. The indication may include a list of BSSIDs or color information.

Figure 2:
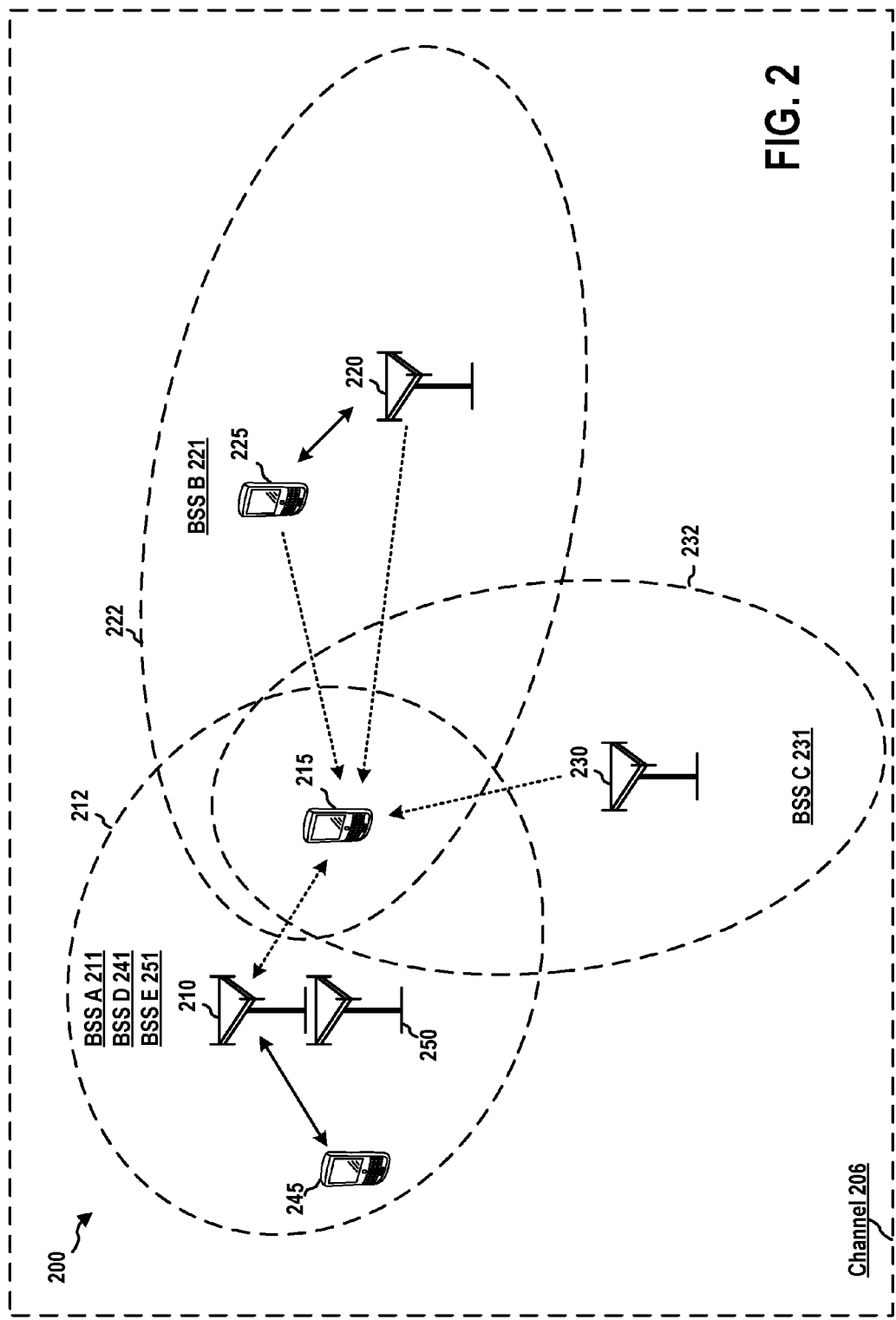
FIG. 2 is a diagram illustrating wireless devices of multiple BSSs in wireless networks.

FIG. 2 is a diagram 200 illustrating wireless devices of multiple BSSs in wireless networks (e.g., Wi-Fi networks). An AP A 210 has a first transmission range 212 and may manage a BSS A 211 and a BSS D 241. The BSS A 211 includes, among other stations, a STA A 215. The BSS D 241 includes, among other stations, a STA D 245. Further, the AP B 220 has a second transmission range 222 and manages a BSS B 221. The BSS B 221 includes, among other stations, a STA B 225. The AP C 230 has a third transmission range 232 and manages a BSS C 231. An APE 250 may be co-located with the AP A 210 and may manage a BSS E 251. The BSSs A-E 211, 221, 231, 241, 251 may utilize the same frequency channel 206. Further, the BSSs B-E 221, 231, 241, 251 overlap with the BSS A 211 and are considered as OBSSs of the BSS A 211.

In this example, the STA A 215 belongs to the BSS A 211 and is within the first transmission range 212, the second transmission range 222, and the third transmission range 232. In addition to receiving packets belonging to the BSS A 211, the STA A 215 may also receive packets belonging to the BSSs B-E 221, 231, 241, 251 transmitted from the access points and stations of those BSSs.

In order to increase reuse of the frequency channel 206, it may be advantageous for devices such as the STA A 215 to drop packets that are from OBSSs in certain circumstances. In certain configurations, upon receiving a packet, the STA A 215 may determine the BSSID of the received packet. If the BSSID of the packet does not match the BSSID of the BSS to which the STA A 215 belongs (e.g., the BSS A 211), the STA A 215 may drop the packet. In other words, the STA A 215 may ignore the packet and may not honor the network allocation vector (NAV) of the packet. Particularly, the STA A 215 may choose to transmit another packet on the frequency channel 206 during the NAV of the packet if the transmission is otherwise allowed.

In certain configurations, upon receiving a packet, the STA A 215 may determine a color of the packet. If the color of the packet does not match the color of the BSS to which the STA A 215 belongs (i.e., the BSS A 211), the STA A 215 may drop the packet. In an aspect, color may be an identifier, different from a BBSID, that identifies a basic service set or an access point associated with the basic service set. Color may be a 6-bit identifier, for example.

In the configurations described above, when the STA A 215 receives packets communicated between the STA D 245 and the AP A 210 and belonging to the BSS D 241, the STA A 215 may drop the received packets. The STA A 215 may drop the received packets even though the BSS D 241 is associated with the same AP (e.g., the AP A 210) of the BSS A 211, as the BSSID or color of the packet may not match the BSSID or color of the BSS A 211, to which the STA A 215 belongs. This may not be desirable in certain circumstances, as the packets belonging to the BSS D 241 may cause strong interference to the packets belonging to the BSS A 211. Further, packets from the BSS E 251 may also be dropped by the STA A 215, which may not be desirable in certain circumstances, as the packets belonging to the BSS E 251 may also cause strong interference to the packets belonging to the BSS A 211

In certain configurations, to improve implementation of channel reuse, the AP A 210 may send indications of the one or more OBSSs whose packets the stations of the BSS A 211 are required to defer to. For example, the indications may be included in a management frame transmitted by the AP A 210 for the BSS A 211.

Figure 3:
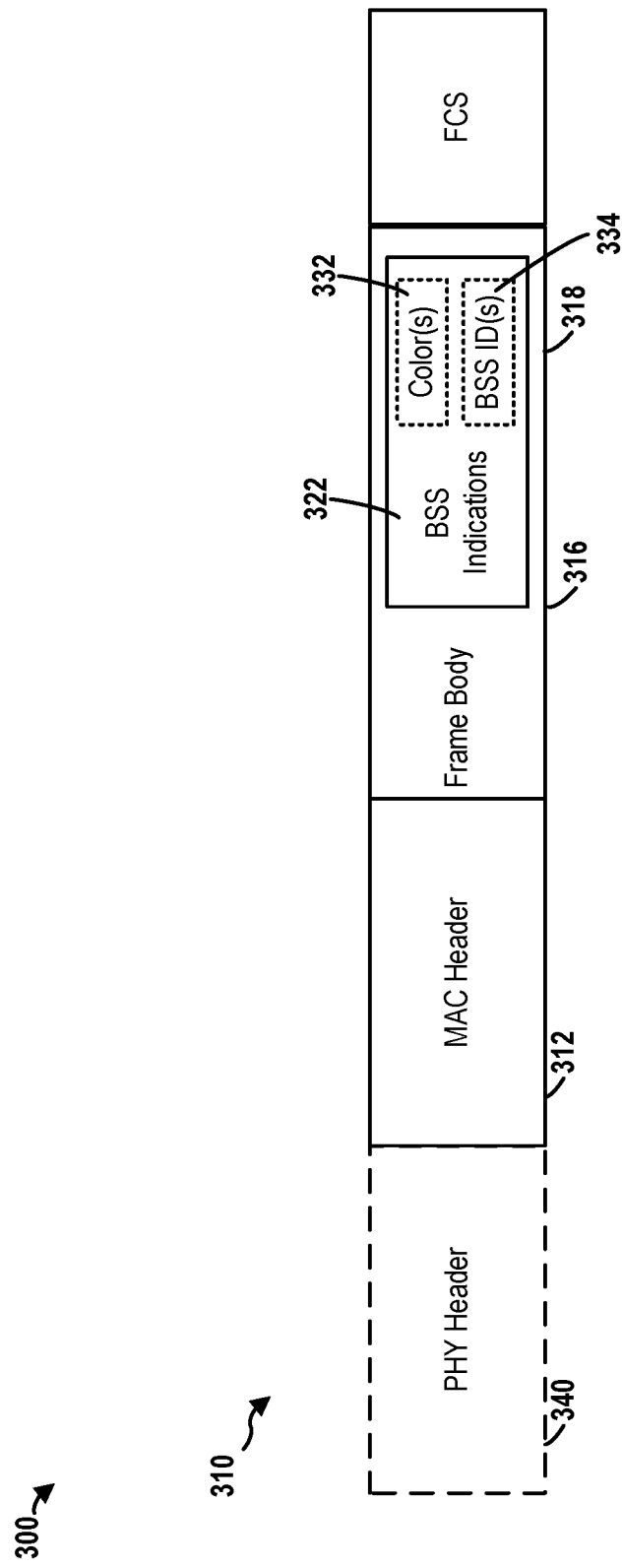
FIG. 3 is a diagram illustrating a management frame.

FIG. 3 is a diagram 300 illustrating a management frame. A management frame 310 includes a medium access control (MAC) header 312, a frame body 316, and a frame check sequence (FCS) field 318. In one aspect, the indications may be included in an existing information element (IE) of the frame body 316. In another aspect, the frame body 316 may include an BSS indications IE 322 (or a multi-BSS identifier IE) that is used to carry the indications. In another aspect, the MAC header 312 may include the indications. In another aspect, the indications may be included in a physical header (e.g., in a color field of a PHY header 340 in a preamble of a frame) that is separate from the MAC header 312. As described below in more detail, the indications may include one or more colors 332 and/or one or more BSSIDs 334. The colors 332 may correspond to colors to which a device is expected to defer communications and/or colors to which a device is not expected to defer communications. The BSSIDS 334 may correspond to BSSIDs to which a device is expected to defer communications and/or BSSIDs to which a device is not expected to defer communications.

In one technique, the management frame 310 may be an association response frame. Prior to joining the BSS A 211, the STA A 215 may send an association request to the AP A 210 to request to be associated with the BSS A 211. Upon deciding to accept the association request of the STA A 215, the AP A 210 sends an association response frame to the STA A 215. In one aspect, the frame body 316 of the association response frame may include the indications of the BSSIDs whose packets must be deferred to or the BSSIDs whose packets the STA A 215 need not defer to In another aspect, the indications may be in the MAC header 312 or a physical header instead of the frame body 316.

In another technique, the management frame 310 may be a beacon frame. In this example, the AP A 210 may include the indications in each beacon frame sent by the AP A 210 for the BSS A 211. Alternatively, the AP A 210 may include the indications in a selected subset of beacon frames of all beacon frames sent by the AP A 210 for the BSS A 211. For example, the AP A 210 may include the indications in one beacon frame of every N beacon frames, N being an integer greater than 1.

An access point may determine whether a packet of a particular BSS and/or OBSS is to be deferred to by the one or more stations of the BSS associated with the access point, e.g., whether the particular BSS and/or OBSS is to be deferred to by the one or more stations, based on various factors. Accordingly, upon receiving a packet of the particular BSS, the one or more stations may defer to or drop the packet as indicated by the access point. In an aspect, the access point may indicate the BSSs to be deferred to, for example, by providing the station with a list of all known BSSIDs associated with the access point if the access point has more than one BSSID. The list may be transmitted in an association response, a beacon, or another message type. In another aspect, the list may also include BSSIDs associated with nearby and/or co-located access points to which stations are to defer because it may be undesirable (e.g., too much interference) for stations to transmit on top of packets from nearby and/or co-located access points. In another aspect, if the indications are color information (e.g., a 6-bit identifier), then the access points may determine to use the same color for all BSSIDs associated with the same access point. If different BSSIDs for the same access point have different colors, then the station associated with the access point may not know to defer to the other colors.

In an aspect, a packet from the same BSS of a receiving station may be always observed by the receiving station. Observing the received packet from the same BSS means that the receiving station further processes the packet to determine whether the packet is addressed to the receiving station. If the packet is addressed to the receiving station, the station may send the packet to the upper layers (e.g., the internet protocol (IP) layer and/or the application layer) at the receiving station. If the packet is not addressed to the receiving station, the receiving station may honor (or refrain from transmitting during) a period reserved on the channel in relation with the packet (e.g., through the NAV). If the packet belongs to an OBSS, the receiving station may determine whether to honor a period reserved on the channel associated with the packet (e.g., through the NAV). A packet of, from, or belonging to, a particular BSS means that the packets is intended to be observed by devices of the particular BSS. For example, the packet may include the BSSID of the particular BSS.

The example described below may use the AP A 210 as an example. Nonetheless, the techniques described can be similarly applied to other access points and/or stations. Referring back to FIG. 2, in certain configurations, the AP A 210 may determine that an OBSS (e.g., the BSS D 241) that is also associated with the same AP A 210 is to be deferred to. Further, the AP A 210 may determine that an OBSS (e.g., the BSS E 251) that is associated with another access point co-located with the AP A 210 is to be deferred to. Accordingly, in this example, the AP A 210 may determine that the BSS A 211, the BSS D 241, and the BSS E 251 are to be deferred to, as packets from the BSS D 241 and the BSS E 251 may cause interference to the reception of the packets of the BSS A 211.

In certain configurations, the AP A 210 determines whether an OBSS is to be deferred to based on a signal strength of a signal received at the AP A 210 from the OBSS. For example, the AP A 210, upon receiving beacon frames from the neighboring APs (e.g., beacon frames from the AP B 220, the AP C 230, and the AP E 250), may determine the signal strength of the beacon frames. If the signal strength of a particular beacon frame is above a threshold, the AP A 210 may determine that the OBSS of the particular beacon frame is to be deferred to; otherwise, the AP 210 may determine that no deferral is needed for the OBSS. The signal strength may be determined based on received signal strength indication (RSSI).

In certain configurations, the AP A 210 may discover the neighboring access points through various techniques. For example, the AP A 210 may send a neighbor report request frame on the frequency channel 206 and, then, receive neighbor report response frames from the surrounding stations. The neighbor report response frames may include information of the APs B, C, and E 220, 230, 250.

In one aspect, the AP A 210 may further determine whether to defer to a particular BSS associated with the AP A 210, the AP B 220, the AP C 230, or the AP E 250 based on a distance between the BSS A 211 and the particular BSS. For example, the distance may be a BSS distance between the BSS A 211 and the particular BSS. The BSS distance may be a function of AP to AP distance. Using the BSS B 221 as an example, the BSS distance is a function of the distance between the AP A 210 and the AP B 220. Specifically, the farther away the neighboring access point is, the greater the BSS distance is. In addition or alternatively, the BSS distance may be a function of the distances from the access point of the particular BSS to the stations of the particular BSS. Using the BSS B 221 as an example, the BSS distance is a function of the distance between the AP B 220 and the STA B 225, as well as the distance between AP A 210 and the STA A 215. Specifically, the closer the stations are to their respective access points, the greater the BSS distance is. In addition or alternatively, the BSS distance may be a function of the distances from the AP A 210 to the stations of the particular BSS. Using the BSS B 221 as an example, the BSS distance is a function of the distance between the AP A 210 and the STA B 225. Specifically, the closer the stations of the particular BSS is to the AP A 210, the smaller the BSS distance is.

In another aspect, the AP A 210 may determine to defer to a particular OBSS based on whether the BSS distance of the particular OBSS is greater or less than a distance threshold. For example, the AP A 210 may determine that the BSS distance of the BSS B 221 is greater than the distance threshold and, thus, packets from the BSS B 221 do not need to be deferred to by the one or more stations of the BSS A 211. Note that, the decision to not defer to packets of the BSS B 221 may still be subject to additional criteria. The AP A 210 may determine that the BSS distances of the BSS C 231 and the BSS E 251 are smaller than the threshold and, thus, packets from the BSS C 231 and the BSS E 251 are to be deferred to by the one or more stations of the BSS A 211.

In another aspect, the AP A 210 may negotiate with a neighbor access point (i.e., the AP A 210, the AP B 220, the AP C 230, or the AP E 250) to determine whether to defer to the OBSSs associated with the neighbor access point. For example, through negotiation, the AP A 210 may estimate the interference it causes to the access point and the stations of the particular OBSS. Based on the interference level, the AP A 210 may determine whether to defer to the particular OBSS.

In certain configurations, the AP A 210 may be configured by a network operator with a list of BSS and/or OBSSs that are to be deferred to. For example, the list may include BSSIDs associated with the BSS A 211, BSS C 231, the BSS D 241, and the BSS E 251 and not include BSSID associated with the BSS B 221.

Once the AP A 210 has determined or been configured with the BSSIDs that are to be deferred to by the one or more stations of the BSS A 211, the AP A 210 may send indications of the BSSIDs to be deferred to as described above (e.g., through a management frame).

In one aspect, the indication may include the BSSIDs of the BSSs and the OBSSs to be deferred to. The BSSIDs may be included in a management frame as previously described. Subsequently, when the STA A 215 receives a packet, the STA A 215 extracts the BSSID of the packet (e.g., the BSSID may be included in a receive address field or transmit address field of the packet) and determines whether the extracted BSSID matches the BSSID of the BSS A 211 or one of the BSSIDs included in the list received from the AP A 210. If the extracted BSSID matches one of the BSSIDs included in the list (which may include the BSSID of the BSS A 211), the STA A 215 observes the packet. The STA A 215 observes the packet by setting the NAV based on the packet. Otherwise, the STA A 215 may choose to drop the packet (e.g., ignore the packet and not set a NAV based on the packet).

In another aspect, the indication may be the colors of the BSSs to be deferred to. The colors of all the BSSs to be deferred to may be included in a management frame as previously described. In one example, the colors may include color information associated with the BSS A 211 and color information associated with the BSS D 241 and the BSS E 251. In an aspect, the AP A 211 may be associated with two BSSIDs corresponding to the BSS A 211 and the BSS D 241, and AP A 211 may assign the same color for the BSS A 211 and for the BSS D 241. Subsequently, when the STA A 215 receives a packet, the STA A 215 determines the color of the packet and determines whether the color of the packet matches the color of a BSS to be deferred to. When the color of the packet matches one of those colors, the STA A 215 observes the packet. Otherwise, the STA A 215 may choose to drop the packet.

In an aspect, the packet may include a flag that indicates whether color information or BSSID is included with the packet. In this aspect, the STA A 215 may determine whether to look for color information or a BSSID in the packet. Alternatively, the STA A 215 may be preconfigured to look for color information and/or a BSSID.

In another aspect, the AP A 210 may assign the color of the BSS A 211 as the same color of a particular OBSS (e.g., the BSS E 251) to be deferred to. In this aspect, the AP A 210 may choose not to send any indications to the one or more stations of the BSS A 211, as the stations are configured to observe packets of the color of the BSS A 211. As such, the stations of the BSS A 211 may observe the packets from the BSS A 211 and the particular OBSS having the same color. Further, the AP A 210 may further negotiate with the access points of the OBSSs to be deferred to assign the same color to the BSS A 211 and the OBSSs to be deferred to. Similarly, the AP A 210 may choose not to send any indications to the one or more stations of the BSS A 211, as the stations are configured to observe packets having the color of the BSS A 211. As such, the stations of the BSS A 211 may observe the packets from the BSS A 211 and the OBSSs to be deferred to.

The foregoing examples described APs determining which BSS to which associated stations should defer. Because the techniques, methods, and protocols described are also applicable to STAs, in some instances, STAs may also autonomously determine which BSSs to defer to without receiving an indication from the AP. STAs may determine which BSSs to defer to based on the techniques described herein. In such instances, STAs may indicate to the AP which OBSSs to defer to.

Further, although the aforementioned embodiments describe indications provided in a management frame, other suitable frames may also be used to indicate the BSSs for deferral by including the indications within an existing IE or the BSS indications IE 322. Additionally, any methods and techniques described with respect to using BSSIDs for increasing reuse are also applicable to color information, and vice versa.

Figure 4:
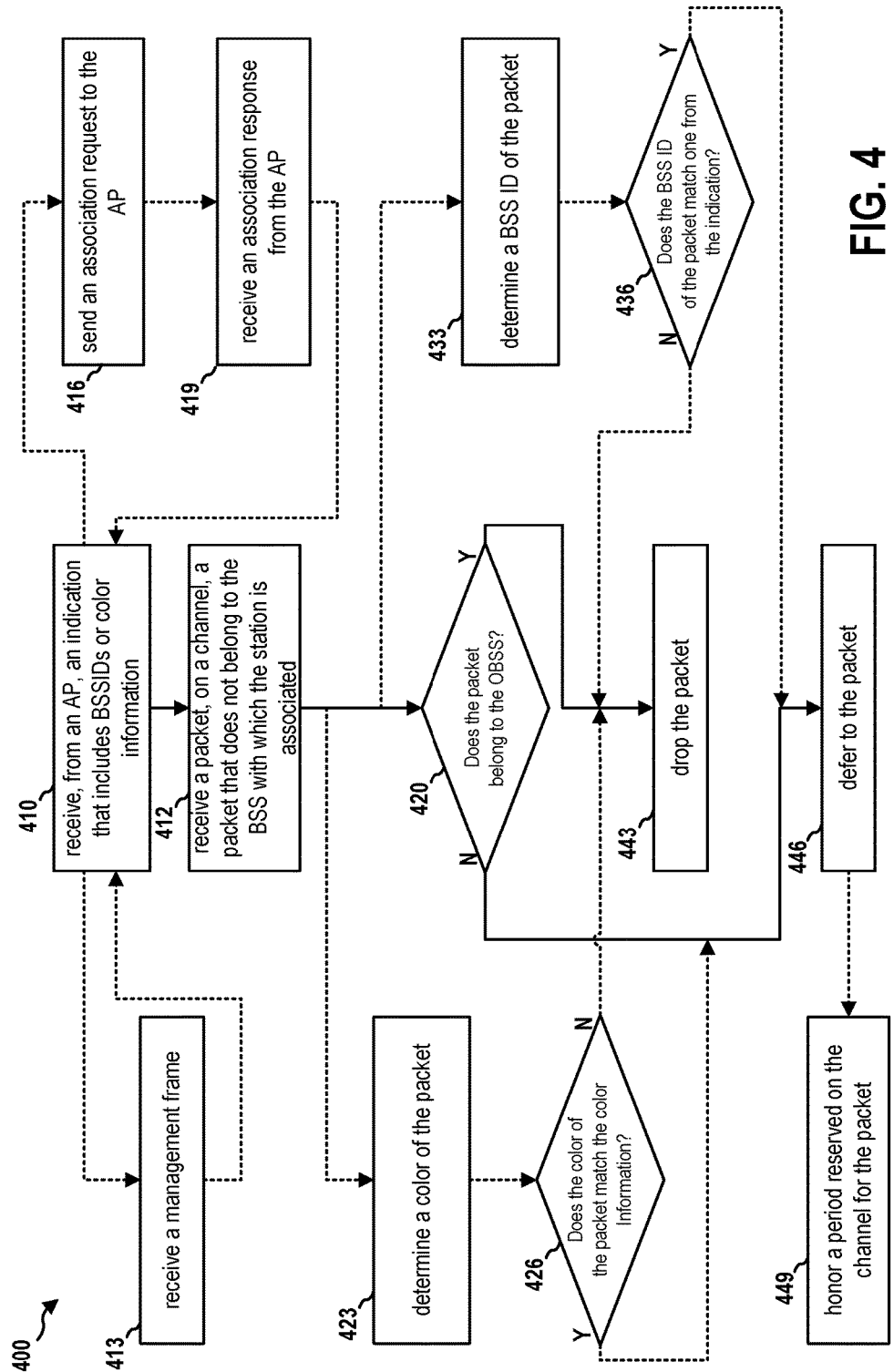
FIG. 4 is a flow chart of a method/process of a station for deferring to a received packet.

FIG. 4 is a flow chart 400 of a method/process of a station for deferring to a received packet. The method may be performed by a station (e.g., the STAs A, B, and D 215, 225, 245, the wireless device 602, or the wireless communication device 700). At operation 410, the station may receive, from an access point of a BSS, an indication of a BSS to be deferred to. The station may be associated with the BSS. In certain configurations, within operation 410, the station, at operation 413, may receive a management frame. The indication may be included in the management frame. For example, referring to FIG. 2, the station may be the STA A 215. The STA A 215 may receive, from the AP A 210, a management frame with the BSS indications IE 322. The BSS indications IE 322 may include an indication instructing the STA A 215 to defer to BSS A, 211, BSS C 231, BSS D 241, and BSS E 251.

In certain configurations, within operation 410, the station, at operation 416, may send an association request to the access point prior to being associated with the access point in the BSS. At operation 419, the station may receive an association response from the access point. The indication may be included in the association response. For example, referring to FIG. 2, the STA A 215 may send an association request to the AP A 210 before becoming associated with AP A 210 in the BSS A 211. In response to the association request, the STA A 215 may receive an association response from the AP 210, and the association response may include the indication of which BSSs to defer to. The indication may be a BSSID or color information.

Subsequent to operation 410, the station, at operation 412, receives a packet that does not belong to the BSS of the STA A 215 on a channel. For example, referring to FIG. 2, the STA A 215 may receive a packet that does not belong to the BSS A 211 on frequency channel 206.

At operation 420, the station determines whether the packet belongs to a BSS to be deferred to (e.g., an OBSS). For example, referring to FIG. 2, the STA A 215 may determine whether the packet belongs to the OBSS to be deferred to, which may include BSS C, 231, BSS D 241, and BSS E 251. In another aspect, the indication may indicate one or more BSSs for which the station should not defer to. In certain configurations, the indication of is a color of the OBSS to be deferred to. To determine whether the packet belongs to the OBSS to be deferred to, the station, at operation 423, determines a color of the packet. At operation 426, the station determines whether the color of the packet matches the color of the OBSS to be deferred to. For example, the STA A 215 may determine whether the packet belongs to the OBSS to be deferred to based on a color of the packet and whether to the color of the packet matches the color of the BSS C, 231, BSS D 241, or BSS E 251. If the color matches, then the STA A 215 may defer transmissions; otherwise; the STA A 215 may not defer transmissions.

In certain configurations, the indication of is a BSSID of the OBSS to be deferred to. To determine whether the packet belongs to the OBSS to be deferred to, the station, at operation 433, determines a BSS ID of the packet. At operation 436, the station determines whether the BSS ID of the packet matches the BSSID of the OBSS to be deferred to. For example, the STA A 215 may determine whether the packet belongs to the OBSS to be deferred to based on a BSSID indicated in the packet and whether to the BSSID of the packet matches the BSSID of the BSS C, 231, BSS D 241, or BSS E 251. If the BSSID matches, then the STA A 215 may defer transmissions; otherwise; the STA A 215 may not defer transmissions.

In response to a determination that the packet belongs to the OBSS to be deferred to, the station, at operation 446, defers to the packet. In certain configurations, in response to a determination that the packet does not belong to the OBSS to be deferred to, the station, at operation 443, drops the packet. When a station defers to a packet, the station may not transmit during the time duration indicated in the packet. The time duration may be the length of the packet or may be greater than the length of the packet. When a station does not defer to the packet, then the station may transmit during the entire time duration or may not transmit during a portion of the time duration. The aspect of dropping a packet may be subset of the deferral function. When a station drops a packet, it was as if the packet was never received, and therefore, the station may transmit during the entire time duration indicated in the packet. In an example, referring to FIG. 2, if the STA A 215 determines that the packet belongs to BSS C, 231, BSS D 241, or BSS E 251, then the STA A 215 defers to the packet and does not transmit for a time duration based on the NAV set based on the packet. Otherwise, if the packet does not belong to at least one of the BSS C, 231, BSS D 241, or BSS E 251, then the STA A 215 may drop the packet and transmit.

In certain configurations, the BSS and the OBSS to be deferred to are both associated with the same access point. In certain configurations, the OBSS to be deferred to is associated with another access point that is co-located with the access point. In certain configuration, the OBSS to be deferred to is associated with another access point that is not co-located with the access point.

In certain configurations, to defer to the packet, at operation 449, the station honors a period reserved on the channel for the packet when the packet belongs to the OBSS to be deferred to. For example, referring to FIG. 2, the STA A 215 honors the period by refraining from transmitting during the period reserved on the frequency channel 206 for the packet when the packet belongs to at least one of the BSS C, 231, BSS D 241, or BSS E 251.

Figure 5:
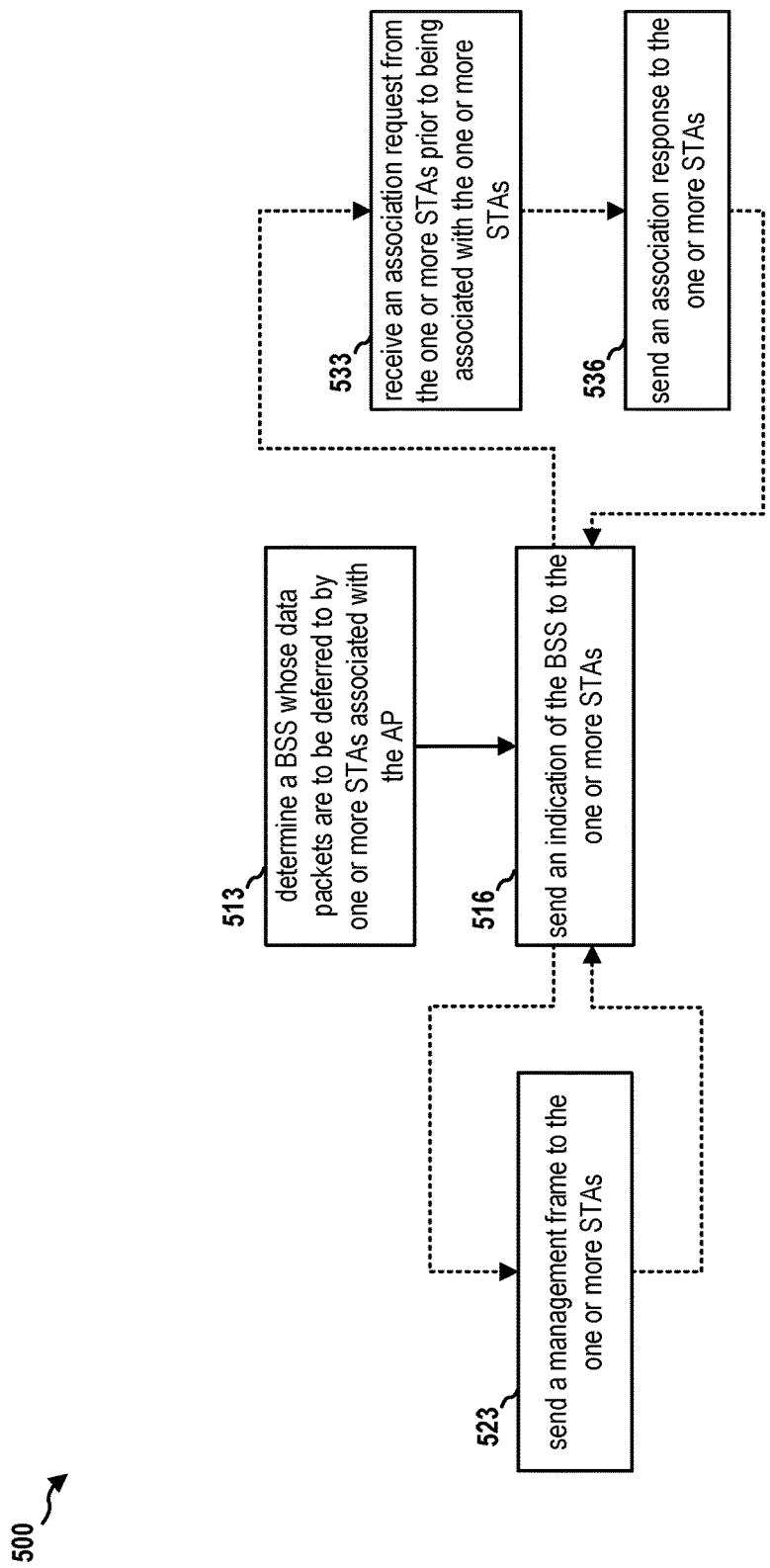

FIG. 5 is a flow chart 500 of a method/process of an access point for sending indications of OBSSs to be deferred to. The method may be performed by an access point (e.g., the APs A, B, C, and E 210, 220, 230, 250, the wireless device 602, or the wireless communication device 700). At operation 513, the access point determines a BSS whose data packets are to be deferred to by one or more stations associated with the access point. For example, referring to FIG. 2, the access point may be the AP A 210. The AP A 210 may determine the BSS whose data packets are to be differed by one or more stations in the BSS A 211 (e.g., the STA A 215). In certain configurations, within operation 513, the OBSS is determined based on a signal strength of a signal received at the access point from a device of the BSS. For example, referring to FIG. 2, the AP A 210 may determine the RSSI of signals received from the AP B 220 in the BSS B 211. The RSSI may be below a threshold, and therefore, the AP A 210 may determine that BSS B 221 is not one of the BSSs to which the STA A 215 needs to defer to. The AP A 210 may also determine the RSSI of signals received from the AP C 230 is above a threshold. As such, the AP A 210 may determine that the STA A 215 should defer to transmission from the BSS C 231. In certain configurations, within operation 513, the BSS is determined based on a distance between the BSS and the BSS. For example, if the distance between the BSS A 211 and the BSS B 221 is greater than a threshold, then the AP A 210 may determine that deferral to transmission from BSS B 221 is not necessary due to the limited interference from the distance. By contrast, the distance between the BSS A 211 and the BBS C 231 may be below a threshold, and therefore, the AP A 210 may determine that its STAs should defer to packets received from the BSS C 231. In certain configurations, within operation 513, the BSS is determined through a negotiation between the BSS and the BSS. In one example, the AP A 210 and the AP B 220 may exchange messages and estimate the interference caused to each respective BSS based on the exchanged messages. Based on the interference level, the AP A 210 and the AP B 220 may determine whether to defer to each other's BSS. In another example, the AP A 210 and the AP B 220 may determine not to defer even when the interference level is above a threshold because the APs may determine to use different channels, including different frequency bands, for communication.

At operation 516, the access point sends an indication of the BSS to the one or more stations. In certain configurations, within operation 516, the access point, at operation 523, may send a management frame to the one or more stations. The indication may be included in the management frame. For example, referring to FIG. 2, the AP A 210 may send a management frame to the STA A 215, and the management frame may indicate to the STA A 215 to defer to the BSS A 211, the BSS C 231, the BSS D 241, and the BSS E 251. In another configuration, the indication may indicate BSSs to which the station should not defer. The indication may be a list of BSSIDs or color information.

In certain configurations, within operation 516, the access point, at operation 533, may receive an association request from the one or more stations prior to being associated with the one or more stations. At operation 536, the access point may send an association response to the one or more stations. The indication is included in the association response. For example, referring to FIG. 2, the AP A 210 may receive an association request from the STA A 215. The AP A 210 may send an association response to the STA A 215, and the association response may indicate one or more BSSs to which the STA A 215 is to defer to.

In certain configurations, the indication of the OBSS is a color of the OBSS (e.g., color information for the BSS C 231, BSS D 241, and BSS E 251). In certain configurations, the indication of the OBSS is an BSSID of the OBSS (e.g., the BSSID of the BSS C 231, BSS D 241, and BSS E 251).

Figure 6:
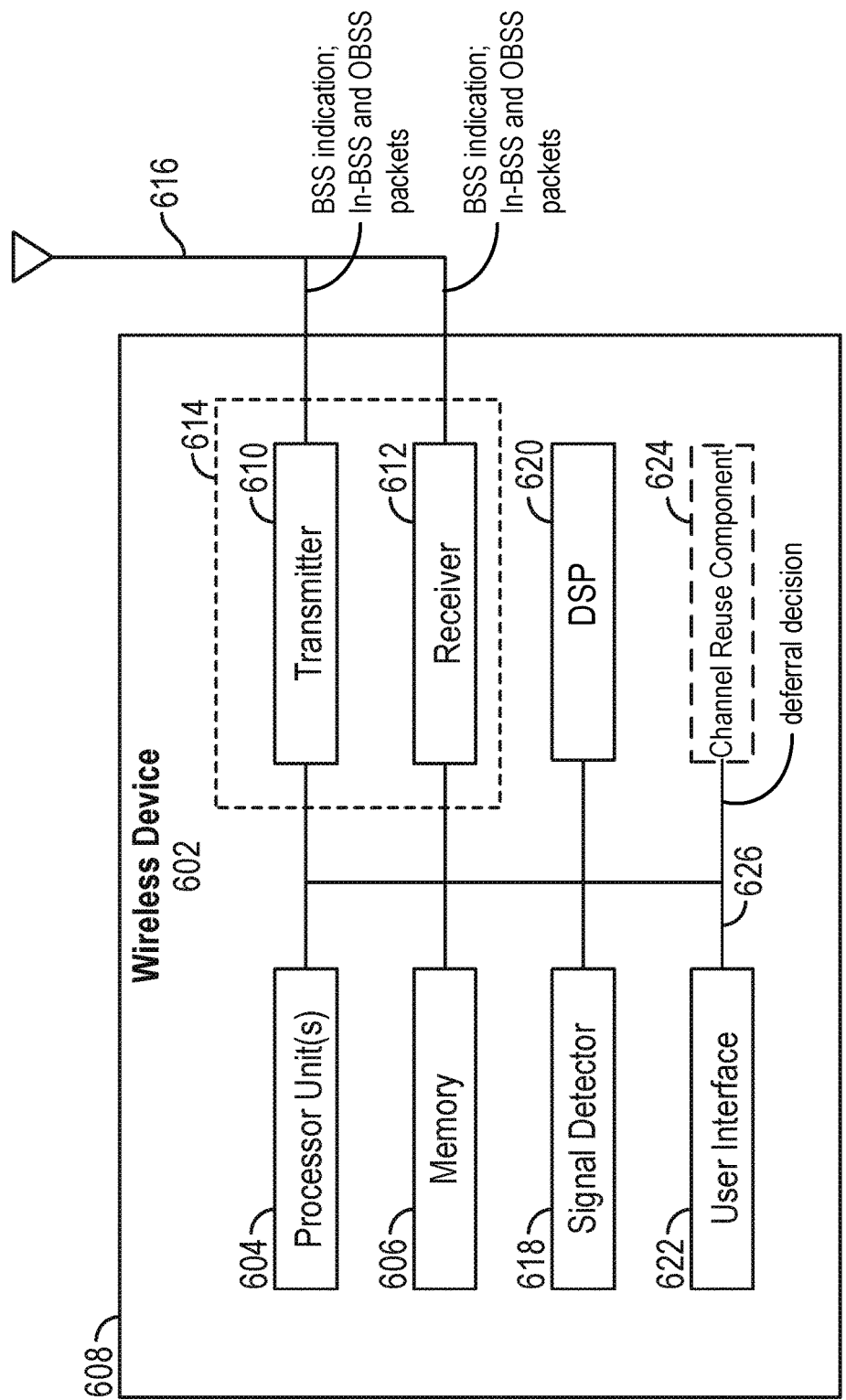
FIG. 6 shows an example functional block diagram of a wireless device that maybe employed within the wireless communication system of FIG. 1 or the wireless networks of FIG. 2.

FIG. 6 shows an example functional block diagram of a wireless device 602 that may be employed within the wireless communication system 100 of FIG. 1 or the wireless networks of FIG. 2. The wireless device 602 is an example of a device that may be configured to implement the various methods described herein. For example, the wireless device 602 may be one of the AP 104 and the APs A 210, B 220, C 230, E 250 or one of the STA 114 and the STAs A 215, B 225, D 245.

The wireless device 602 may include a processor 604 which controls operation of the wireless device 602. The processor 604 may also be referred to as a central processing unit (CPU). Memory 606, which may include both read-only memory (ROM) and random access memory (RAM), may provide instructions and data to the processor 604. A portion of the memory 606 may also include non-volatile random access memory (NVRAM). The processor 604 typically performs logical and arithmetic operations based on program instructions stored within the memory 606. The instructions in the memory 606 may be executable (by the processor 604, for example) to implement the methods described herein.

The processor 604 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 602 may also include a housing 608, and the wireless device 602 may include a transmitter 610 and/or a receiver 612 to allow transmission and reception of data between the wireless device 602 and a remote device. The transmitter 610 and the receiver 612 may be combined into a transceiver 614. An antenna 616 may be attached to the housing 608 and electrically coupled to the transceiver 614. The wireless device 602 may also include multiple transmitters, multiple receivers, multiple transceivers, and/or multiple antennas.

The wireless device 602 may also include a signal detector 618 that may be used to detect and quantify the level of signals received by the transceiver 614 or the receiver 612. The signal detector 618 may detect such signals as total energy, energy per subcarrier per symbol, power spectral density, and other signals. The wireless device 602 may also include a DSP 620 for use in processing signals. The DSP 620 may be configured to generate a packet for transmission. In some aspects, the packet may comprise a physical layer convergence procedure (PLCP) protocol data unit (PPDU).

The wireless device 602 may further comprise a user interface 622 in some aspects. The user interface 622 may comprise a keypad, a microphone, a speaker, and/or a display. The user interface 622 may include any element or component that conveys information to a user of the wireless device 602 and/or receives input from the user.

When the wireless device 602 is implemented as an AP (e.g., the AP A 210) or as a STA (e.g., the STA A 215), the wireless device 602 may also include a channel reuse component 624.

In one embodiment, the wireless device 602 may be implemented as an AP. In this embodiment, the channel reuse component 624 may be configured to determine at least one BSS whose packets are to be deferred to by one or more stations in a BSS associated with the access point. The channel reuse component 624 may be configured to transmit an indication of the at least one BSS to the one or more stations. In one aspect, the at least one BSS to be deferred to is determined based on a signal strength of a signal received at the access point from a device associated with the at least one BSS to be deferred to. In another aspect, the at least one BSS to be deferred to is determined based on a distance between the BSS and the at least one BSS to be deferred to. In another aspect, the at least one BSS to be deferred to is determined through a negotiation between the BSS and the at least one BSS to be deferred to. In another aspect, the indication is transmitted to the one or more stations in an association response, in a management frame, or in a beacon frame. In another aspect, the indication includes one of a list of BSSIDs to which the one or more stations are to defer transmissions or not to defer transmissions or color information that includes one or more colors identifying BSSs to which the one or more stations are to defer transmissions or not to defer transmissions.

In another embodiment, the wireless device 602 may be implemented as a station. In this embodiment, the channel reuse component 624 may be configured to receive, on a channel, a packet from a wireless device. The channel reuse component 624 may be configured to determine a BSSID or a color associated with the received packet. The channel reuse component 624 may be configured to determine whether to defer transmissions on the channel based on the determined BSSID or the determined color associated with the packet and an indication. The indication may include a list of BSSIDs or color information. The channel reuse component 624 may be configured to drop the packet based on the determination to defer transmissions by discarding the packet and by not setting a network allocation vector based on the packet. In one configuration, the channel reuse component 624 may be configured to determine whether to defer transmissions by refraining from transmitting during a time period reserved on the channel on which the packet is received, in which the time period is less than or equal to a time duration indicated in the packet. In another aspect, the list of BSSIDs may include multiple BSSIDs associated with a same access point, and the list of BSSIDs may indicate BSSIDs to which transmission is to be deferred or to which transmission is not to be deferred. In another aspect, the station may be associated with a first access point, the list of BSSIDs may include at least one BSSID associated with a second access point that is co-located with the first access point, and the list of BSSIDs may instruct the station to defer transmission if packets are received from the at least one BSSID. In another configuration, the channel reuse component 624 may be configured to receive the indication from an access point associated with the station. In another aspect, the indication may be received in an association response from the access point, from a management frame from the access point, or from a beacon from the access point. In another aspect, the color information may include one or more colors corresponding to one or more basic service sets to which transmission is to be deferred or to which transmission is not to be deferred. In another aspect, a color included in the color information may be associated with multiple basic service sets or multiple access points.

The various components of the wireless device 602 may be coupled together by a bus system 626. The bus system 626 may include a data bus, for example, as well as a power bus, a control signal bus, and a status signal bus in addition to the data bus. Components of the wireless device 602 may be coupled together or accept or provide inputs to each other using some other mechanism.

Although a number of separate components are illustrated in FIG. 6, one or more of the components may be combined or commonly implemented. For example, the processor 604 may be used to implement not only the functionality described above with respect to the processor 604, but also to implement the functionality described above with respect to the signal detector 618, the DSP 620, the user interface 622, and/or the channel reuse component 624. Further, each of the components illustrated in FIG. 6 may be implemented using a plurality of separate elements.

Figure 7:
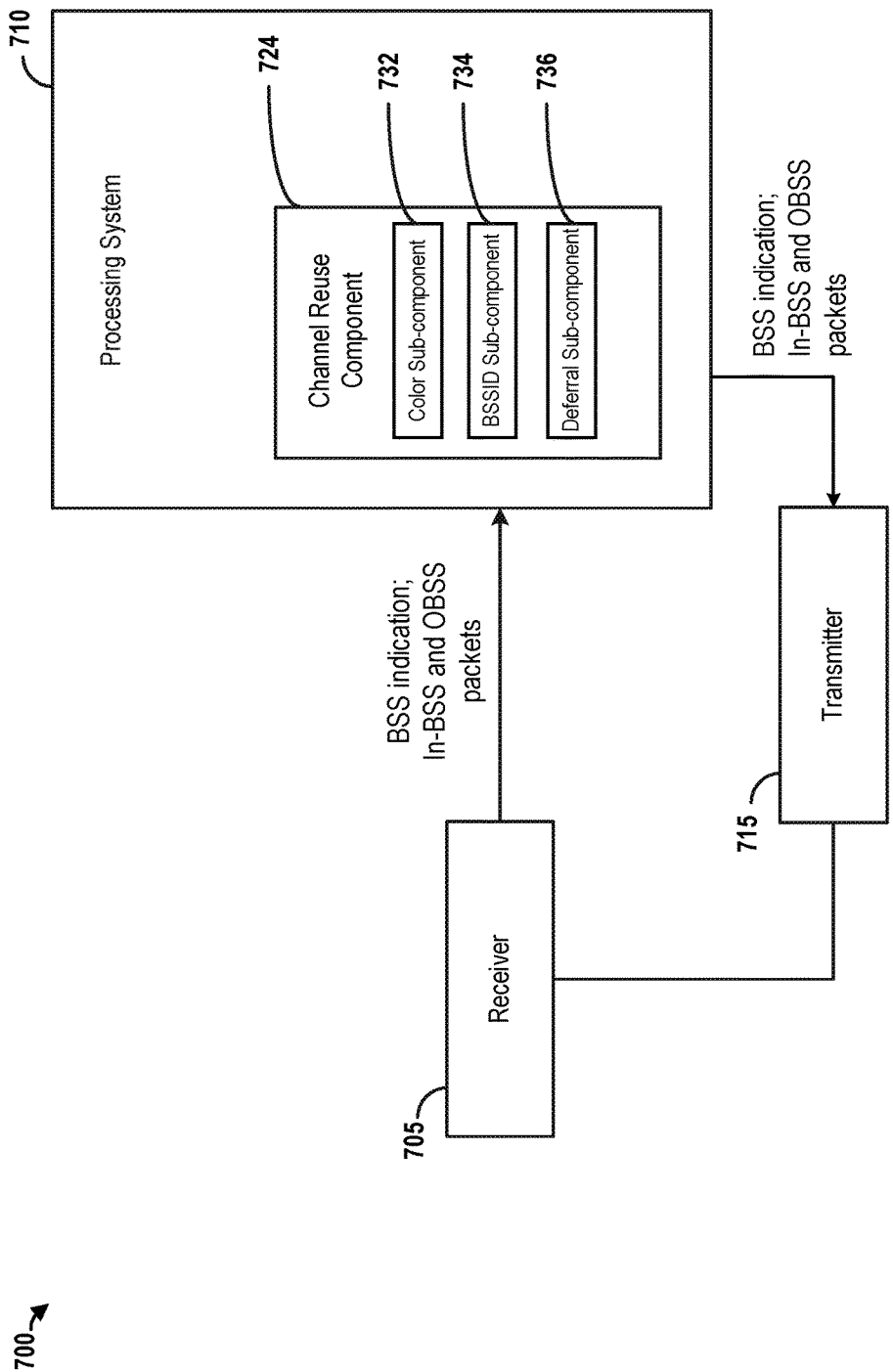
FIG. 7 is a functional block diagram of an example wireless communication device.

FIG. 7 is a functional block diagram of an example wireless communication device 700. The wireless communication device 700 may be an apparatus including a receiver 705, a processing system 710, and a transmitter 715. The processing system 710 may include a channel reuse component 724. The channel reuse component 724 may include, among other components, a color sub-component 732, a BSSID sub-component 734, and/or a deferral sub-component 736.

In one embodiment, the wireless communication device 700 may be implemented as an AP. In this embodiment, the processing system 710 and/or channel reuse component 724 may be configured to determine at least one BSS whose packets are to be deferred to by one or more stations in a BSS associated with the wireless communication device 700. The processing system 710 and/or channel reuse component 724 may be configured to transmit an indication of the at least one BSS to the one or more stations. In one aspect, the at least one BSS to be deferred to is determined based on a signal strength of a signal received at the wireless communication device 700 from a device associated with the at least one BSS to be deferred to. In another aspect, the at least one BSS to be deferred to is determined based on a distance between the BSS and the at least one BSS to be deferred to. In another aspect, the at least one BSS to be deferred to is determined through a negotiation between the BSS and the at least one BSS to be deferred to. In another aspect, the indication is transmitted to the one or more stations in an association response, in a management frame, or in a beacon frame. In another aspect, the indication includes one of a list of BSSIDs to which the one or more stations are to defer transmissions or not to defer transmissions or color information that includes one or more colors identifying BSSs to which the one or more stations are to defer transmissions or not to defer transmissions.

In another embodiment, the wireless communication device 700 may be implemented as a station. In this embodiment, the processing system 710, the channel reuse component 724, and/or the receiver 705 may be configured to receive, on a channel, a packet from a wireless device. The processing system 710, the color sub-component 732, the BSSID sub-component 734, and/or the channel reuse component 724 may be configured to determine a BSSID or a color associated with the received packet. The processing system 710, the channel reuse component 724, and/or the deferral sub-component 736 may be configured to determine whether to defer transmissions on the channel based on the determined BSSID or the determined color associated with the packet and an indication. The indication may include a list of BSSIDs or color information. The processing system 710, the channel reuse component 724, and/or the deferral sub-component 736 may be configured to drop the packet based on the determination to defer transmissions by discarding the packet and by not setting a network allocation vector based on the packet. In one configuration, the processing system 710, the channel reuse component 724, and/or the deferral sub-component 736 may be configured to determine whether to defer transmissions by refraining from transmitting during a time period reserved on the channel on which the packet is received, in which the time period is less than or equal to a time duration indicated in the packet. In another aspect, the list of BSSIDs may include multiple BSSIDs associated with a same access point, and the list of BSSIDs may indicate BSSIDs to which transmission is to be deferred or to which transmission is not to be deferred. In another aspect, the wireless communication device 700 may be associated with a first access point, the list of BSSIDs may include at least one BSSID associated with a second access point that is co-located with the first access point, and the list of BSSIDs may instruct the station to defer transmission if packets are received from the at least one BSSID. In another configuration, the processing system 710, the channel reuse component 724, and/or the receiver 705 may be configured to receive the indication from an access point associated with the wireless communication device 700. In another aspect, the indication may be received in an association response from the access point, from a management frame from the access point, or from a beacon from the access point. In another aspect, the color information may include one or more colors corresponding to one or more basic service sets to which transmission is to be deferred or to which transmission is not to be deferred. In another aspect, a color included in the color information may be associated with multiple basic service sets or multiple access points.

The receiver 705, the processing system 710, the channel reuse component 724, the color sub-component 732, the BSSID sub-component 734, the deferral sub-component 736, and/or the transmitter 715 may be configured to perform one or more functions discussed above with respect to operations 410, 412, 413, 416, 419, 420, 423, 426, 433, 436, 443, 446, and 449 of FIG. 4 and to operations 513, 516, 523, 533, and 536 of FIG. 5. The receiver 705 may correspond to the receiver 612. The processing system 710 may correspond to the processor 604. The transmitter 715 may correspond to the transmitter 610. The channel reuse component 724 may correspond to the channel reuse components 124, 126 and/or the channel reuse component 624.

In one configuration, the wireless communication device 700 may include means for determining at least one BSS whose packets are to be deferred to by one or more stations in a BSS associated with the wireless communication device 700. The wireless communication device 700 may include means for transmitting an indication of the at least one BSS to the one or more stations. In one aspect, the at least one BSS to be deferred to is determined based on a signal strength of a signal received at the wireless communication device 700 from a device associated with the at least one BSS to be deferred to. In another aspect, the at least one BSS to be deferred to is determined based on a distance between the BSS and the at least one BSS to be deferred to. In another aspect, the at least one BSS to be deferred to is determined through a negotiation between the BSS and the at least one BSS to be deferred to. In another aspect, the indication is transmitted to the one or more stations in an association response, in a management frame, or in a beacon frame. In another aspect, the indication includes one of a list of BSSIDs to which the one or more stations are to defer transmissions or not to defer transmissions or color information that includes one or more colors identifying BSSs to which the one or more stations are to defer transmissions or not to defer transmissions.

For example, means for determining may include the processing system 710 and/or the channel reuse component 724. Means for transmitting may include the processing system 710, the channel reuse component 724, and/or the transmitter 715.

In another configuration, the wireless communication device 700 may include means for receiving, on a channel, a packet from a wireless device. The wireless communication device 700 may include means for determining a BSSID or a color associated with the received packet. The wireless communication device 700 may include means for determining whether to defer transmissions on the channel based on the determined BSSID or the determined color associated with the packet and an indication. The indication may include a list of BSSIDs or color information. The wireless communication device 700 may include means for dropping the packet based on the determination to defer transmissions. The means for dropping may be configured to discard the packet and to not set a network allocation vector based on the packet. In one configuration, the means for determining whether to defer transmissions may be configured to refrain from transmitting during a time period reserved on the channel on which the packet is received, in which the time period is less than or equal to a time duration indicated in the packet. In another aspect, the list of BSSIDs may include multiple BSSIDs associated with a same access point, and the list of BSSIDs may indicate BSSIDs to which transmission is to be deferred or to which transmission is not to be deferred. In another aspect, the wireless communication device 700 may be associated with a first access point, the list of BSSIDs may include at least one BSSID associated with a second access point that is co-located with the first access point, and the list of BSSIDs may instruct the wireless communication device 700 to defer transmission if packets are received from the at least one BSSID. In another configuration, the wireless communication device 700 may include means for receiving the indication from an access point associated with the station. In another aspect, the indication may be received in an association response from the access point, from a management frame from the access point, or from a beacon from the access point. In another aspect, the color information may include one or more colors corresponding to one or more basic service sets to which transmission is to be deferred or to which transmission is not to be deferred. In another aspect, a color included in the color information may be associated with multiple basic service sets or multiple access points.

For example, means for receiving may include the receiver 705, the processing system 710, and/or the channel reuse component 724. Means for determining a BSSID or a color may include the processing system 710, the channel reuse component 724, the color sub-component 732, and/or the BSSID sub-component 734. Means for determining whether to defer transmissions may include the processing system 710, the channel reuse component 724, and/or the deferral sub-component 736. Means for dropping the packet may include the processing system 710, the channel reuse component 724, and/or the deferral sub-component 736.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an ASIC, an FPGA, or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication by a station, comprising:
   receiving, on a channel, a packet from a wireless device;
   determining a basic service set identifier (BSSID) or a color identifying a basic service set associated with the received packet; and
   determining whether to defer transmissions on the channel based on the BSSID or the color associated with the packet being indicated in an indication comprising a list of BSSIDs or color information,
   wherein the transmissions are deferred when the BSSID or the color associated with the packet is indicated in the list of BSSIDs or in the color information, and
   wherein the transmissions are not deferred when the BSSID or the color associated with the packet is not indicated in the list of BSSIDs or in the color information.

2. The method of claim 1, wherein the determining whether to defer transmissions comprises determining to defer transmissions during a time period reserved on the channel on which the packet is received when the BSSID or the color associated with the packet is indicated in the list of BSSIDs or in the color information, the time period being less than or equal to a time duration indicated in the packet.

3. The method of claim 1, further comprising dropping the packet based on the determination not to defer transmissions, the dropping comprising discarding the packet and not setting a network allocation vector based on the packet.

4. The method of claim 1, wherein the list of BSSIDs includes multiple BSSIDs associated with a same access point, and the list of BSSIDs indicates BSSIDs to which transmission is to be deferred or to which transmission is not to be deferred.

5. The method of claim 1, wherein the station is associated with a first access point, wherein the list of BSSIDs include at least one BSSID associated with a second access point that is co-located with the first access point, and the list of BSSIDs instructs the station to defer transmission if packets are received from the at least one BSSID.

6. The method of claim 1, further comprising receiving the indication from an access point associated with the station, wherein the indication is received in an association response from the access point, from a management frame from the access point, or from a beacon from the access point.

7. The method of claim 1, wherein the color information comprises one or more colors corresponding to one or more basic service sets to which transmission is to be deferred or to which transmission is not to be deferred, or wherein a color included in the color information is associated with multiple basic service sets or multiple access points.

8. A method of wireless communication by a station, comprising:
   receiving, on a channel, a packet from a wireless device;
   determining a basic service set identifier (BSSID) or a color identifying a basic service set associated with the received packet; and
   determining whether to defer transmissions on the channel based on the BSSID or the color associated with the packet being indicated in an indication comprising a list of BSSIDs or color information,
   wherein the transmissions are deferred when the BSSID or the color associated with the packet is not indicated in the list of BSSIDs or in the color information, and
   wherein the transmissions are not deferred when the BSSID or the color associated with the packet is indicated in the list of BSSIDs or in the color information.

9. A method of wireless communication by an access point, comprising:
   determining at least one basic service set (BSS) whose packets are to be deferred to by one or more stations in a BSS associated with the access point; and transmitting an indication of the at least one BSS to the one or more stations, wherein the indication includes one of:
  a list of BSSIDs to which the one or more stations are to defer transmissions or not to defer transmissions, or
  color information comprising one or more colors identifying BSSs to which the one or more stations are to defer transmissions or not to defer transmissions.

10. The method of claim 9, wherein the at least one BSS to be deferred to is determined based on a signal strength of a signal received at the access point from a device associated with the at least one BSS to be deferred to.

11. The method of claim 9, wherein the at least one BSS to be deferred to is determined based on a distance between the BSS and the at least one BSS to be deferred to.

12. The method of claim 9, wherein the at least one BSS to be deferred to is determined through a negotiation between the BSS and the at least one BSS to be deferred to.

13. The method of claim 9, wherein the indication is transmitted to the one or more stations in an association response, in a management frame, or in a beacon frame.

14. A station for wireless communication, comprising:
a memory; and
at least one processor coupled to the memory and configured to:
  receive, on a channel, a packet from a wireless device;
  determine a basic service set identifier (BSSID) or a color identifying a basic service set associated with the received packet; and
  determine whether to defer transmissions on the channel based on the BSSID or the color associated with the packet being indicated in an indication comprising a list of BSSIDs or color information,
  wherein the transmissions are deferred when the BSSID or the color associated with the packet is indicated in the list of BSSIDs or in the color information, and
  wherein the transmissions are not deferred when the BSSID or the color associated with the packet is not indicated in the list of BSSIDs or in the color information.

15. The station of claim 14, wherein the at least one processor is configured to determine whether to defer transmissions by determining to defer transmissions during a time period reserved on the channel on which the packet is received when the BSSID or the color associated with the packet is in the list of BSSIDs or in the color information, the time period being less than or equal to a time duration indicated in the packet.

16. The station of claim 14, wherein the at least one processor is further configured to drop the packet, based on the determination not to defer transmissions, by discarding the packet and by not setting a network allocation vector based on the packet.

17. The station of claim 14, wherein the list of BSSIDs includes multiple BSSIDs associated with a same access point, and the list of BSSIDs indicates BSSIDs to which transmission is to be deferred or to which transmission is not to be deferred.

18. The station of claim 14, wherein the station is associated with a first access point, wherein the list of BSSIDs include at least one BSSID associated with a second access point that is co-located with the first access point, and the list of BSSIDs instructs the station to defer transmission if packets are received from the at least one BSSID.

19. The station of claim 14, wherein the at least one processor is configured to receive the indication from an access point associated with the station, wherein the indication is received in an association response from the access point, from a management frame from the access point, or from a beacon from the access point.

20. The station of claim 14, wherein the color information comprises one or more colors corresponding to one or more basic service sets to which transmission is to be deferred or to which transmission is not to be deferred, or wherein a color included in the color information is associated with multiple basic service sets or multiple access points.

21. A station for wireless communication, comprising:
a memory; and
at least one processor coupled to the memory and configured to:
  receive, on a channel, a packet from a wireless device;
  determine a basic service set identifier (BSSID) or a color identifying a basic service set associated with the received packet; and
  determine whether to defer transmissions on the channel based on the BSSID or the color associated with the packet being indicated in an indication comprising a list of BSSIDs or color information,
  wherein the transmissions are deferred when the BSSID or the color associated with the packet is not indicated in the list of BSSIDs or in the color information, and
  wherein the transmissions are not deferred when the BSSID or the color associated with the packet is indicated in the list of BSSIDs or in the color information.

22. An access point for wireless communication, comprising:
a memory; and
at least one processor coupled to the memory and configured to:
  determine at least one basic service set (BSS) whose packets are to be deferred to by one or more stations in a BSS associated with the access point; and
  transmit an indication of the at least one BSS to the one or more stations,
  wherein the indication includes one of:
    a list of BSSIDs to which the one or more stations are to defer transmissions or not to defer transmissions, or
    color information comprising one or more colors identifying BSSs to which the one or more stations are to defer transmissions or not to defer transmissions.

23. The access point of claim 22, wherein the at least one BSS to be deferred to is determined based on a signal strength of a signal received at the access point from a device associated with the at least one BSS to be deferred to.

24. The access point of claim 22, wherein the at least one BSS to be deferred to is determined based on a distance between the BSS and the at least one BSS to be deferred to.

25. The access point of claim 22, wherein the at least one BSS to be deferred to is determined through a negotiation between the BSS and the at least one BSS to be deferred to.

26. The access point of claim 22, wherein the indication is transmitted to the one or more stations in an association response, in a management frame, or in a beacon frame.

* * * * *